(12) United States Patent
Neuneker et al.

(10) Patent No.: US 10,445,631 B2
(45) Date of Patent: Oct. 15, 2019

(54) RADIO FREQUENCY IDENTIFICATION CONTROLS

(71) Applicant: HEWLETT-PACKARD DEVELOPMENT COMPANY, L.P., Houston, TX (US)

(72) Inventors: Jonathan Neuneker, Boise, ID (US); Greg D. Creager, Boise, ID (US); Shaun Henry, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 5 days.

(21) Appl. No.: 15/749,059

(22) PCT Filed: Nov. 25, 2015

(86) PCT No.: PCT/US2015/062729
§ 371 (c)(1),
(2) Date: Jan. 30, 2018

(87) PCT Pub. No.: WO2017/091230
PCT Pub. Date: Jun. 1, 2017

(65) Prior Publication Data
US 2018/0225558 A1 Aug. 9, 2018

(51) Int. Cl.
*G06K 19/07* (2006.01)
*G06F 3/01* (2006.01)
*G06F 3/023* (2006.01)

(52) U.S. Cl.
CPC .......... *G06K 19/0723* (2013.01); *G06F 3/014* (2013.01); *G06F 3/0233* (2013.01); *G06K 19/0716* (2013.01)

(58) Field of Classification Search
CPC ... G06F 3/014; G06F 3/0233; G06K 19/0716; G06K 19/0723
See application file for complete search history.

(56) References Cited

U.S. PATENT DOCUMENTS 6,888,509 B2 * 5/2005 Atherton ............. G06K 19/073
235/492
7,064,653 B2 6/2006 Dalglish
(Continued)

FOREIGN PATENT DOCUMENTS

| EP | 2839447 A1 | 2/2015 |
|---|---|---|
| WO | WO-01-06507 A1 | 1/2001 |
| WO | WO-2008075232 A2 | 6/2008 |

OTHER PUBLICATIONS

Sample, A.P. et al, "A Capacitive Touch Interface for Passive RFID Tags", Mar. 13, 2009.
(Continued)

*Primary Examiner* — Sisay Yacob
(74) *Attorney, Agent, or Firm* — Brooks Cameron & Huebsch PLLC

(57) ABSTRACT

Examples described herein include examples of a radio frequency identification control that includes an identifier element, an antenna element, and a pressure sensitive switch to selectively couple the radio identifier circuit to the antenna element to complete a radio frequency identification circuit. In some examples, the radio frequency identification control can be integrated into a self-adhesive sticker. A unique identification code associated with the radio frequency identification control can be registered with a computing system to initiate a user-defined function.

15 Claims, 7 Drawing Sheets

(56) References Cited

U.S. PATENT DOCUMENTS

| | | |
|---|---|---|
| 2005/0184878 A1 | 8/2005 | Grold et al. |
| 2006/0139159 A1 | 6/2006 | Lee et al. |
| 2007/0057790 A1* | 3/2007 | Alden .................. G06F 3/0202 |
| | | 340/572.1 |
| 2009/0128289 A1 | 5/2009 | Rossman |
| 2011/0254665 A1 | 10/2011 | Lindsay |
| 2011/0285534 A1 | 11/2011 | Seo et al. |
| 2012/0056719 A1 | 3/2012 | Krishna et al. |
| 2014/0001271 A1 | 1/2014 | Rossman et al. |

OTHER PUBLICATIONS

International Searching Authority, International Search Report and Written Opinion for PCT Application No. PCT/US2015/062729, dated Aug. 22, 2016, 13 pages.

* cited by examiner

RADIO FREQUENCY IDENTIFICATION CONTROLS

BACKGROUND

Many types of user input devices are available for interacting with computing devices. Devices such as keyboards, keypads, mice, touchscreens, touchpads, styluses, and the like, offer users a variety of user input experiences. Each type of device is often characterized by its strengths for entering different types of user input. For example, keyboards are useful for rapid entry of individual characters when typing prose and programming code. Keypads are useful for easily entering numerical data and using applications such as spreadsheets and accounting packages. User input devices such as mice, touchscreens, touchpads, etc., are useful for interacting with dynamic graphical user interfaces that provide intuitive control of many types of application and operating system functionalities and settings. However, the speed and efficacy of all such input devices is often dependent on the experience and/or dexterity of the user.

DETAILED DESCRIPTION

Implementations of the present disclosure include systems, devices, and methods for initiating specific user-defined computer functions using pressure sensitive radio frequency identification (RFID) controls affixed to arbitrary surfaces. In one example, pressure sensitive RFID controls can include a self-adhesive element that can be affixed to a body part of a user, such as a hand, palm, toe, and the like. Similarly, the pressure sensitive RFID controls can be applied to the surface of any object, such as an open area on a keyboard, mouse, touchpad, monitor, desk, etc. As such, the user can initiate an associated computer function by applying pressure to the pressure sensitive RFID control (e.g., tapping the hand, palm, or toe to which the pressure sensitive RFID control is a fixed against another surface such as a tabletop or desk). In this way, special-purpose user input buttons can be created according to user supplied definitions.

Figure 1:
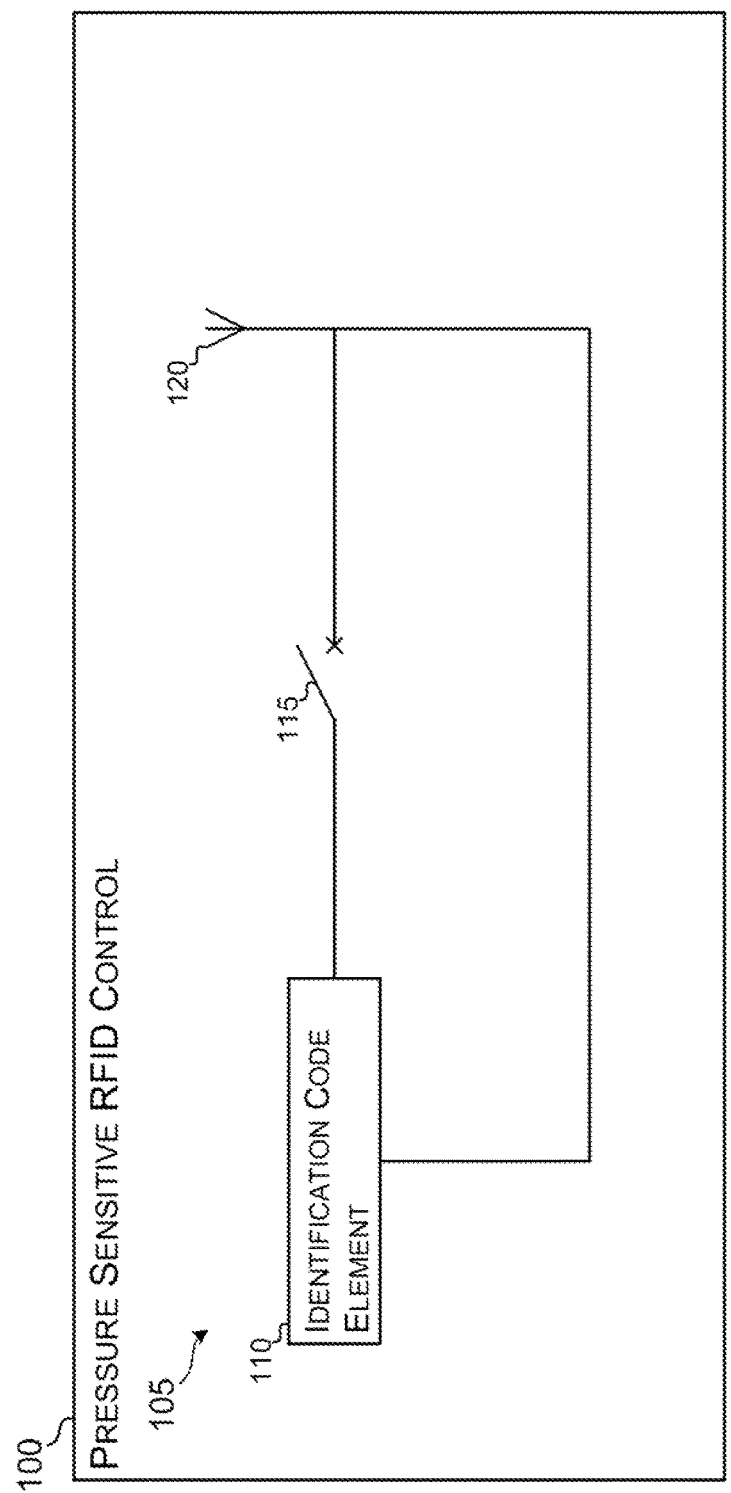
FIG. 1 depicts a schematic diagram of an example pressure sensitive radio frequency identification control.

FIG. 1 depicts a schematic view of an example pressure sensitive RFID control 100. As illustrated, the pressure sensitive RFID control 100 can include an identification code element 110, a pressure sensitive switch 115, and an antenna 120. In various example implementations, the switch 115 can selectively complete an RFID circuit 105 that includes the identification code element 110 and the antenna 120. As such, when the RFID circuit 105 is completed and in the presence of a corresponding radio frequency signal, the RFID circuit 105 can be energized by the incoming radio frequency signal to transmit an identification code stored in or caused by the identification code element 110 using the antenna 120. The identification code element 110 can include a circuit or memory that stores a unique identification code. When pressure is applied to the pressure sensitive RFID control 100, the switch 115 can be activated to complete the RFID circuit 105. Applying pressure can include pressing down on a surface of the pressure sensitive RFID control 100. For example, in implementations in which the pressure sensitive RFID control 100 is included in a self-adhesive planar sticker, applying pressure can include pressing down in a direction perpendicular substantially perpendicular to the planar surface of the sticker.

Figure 2:
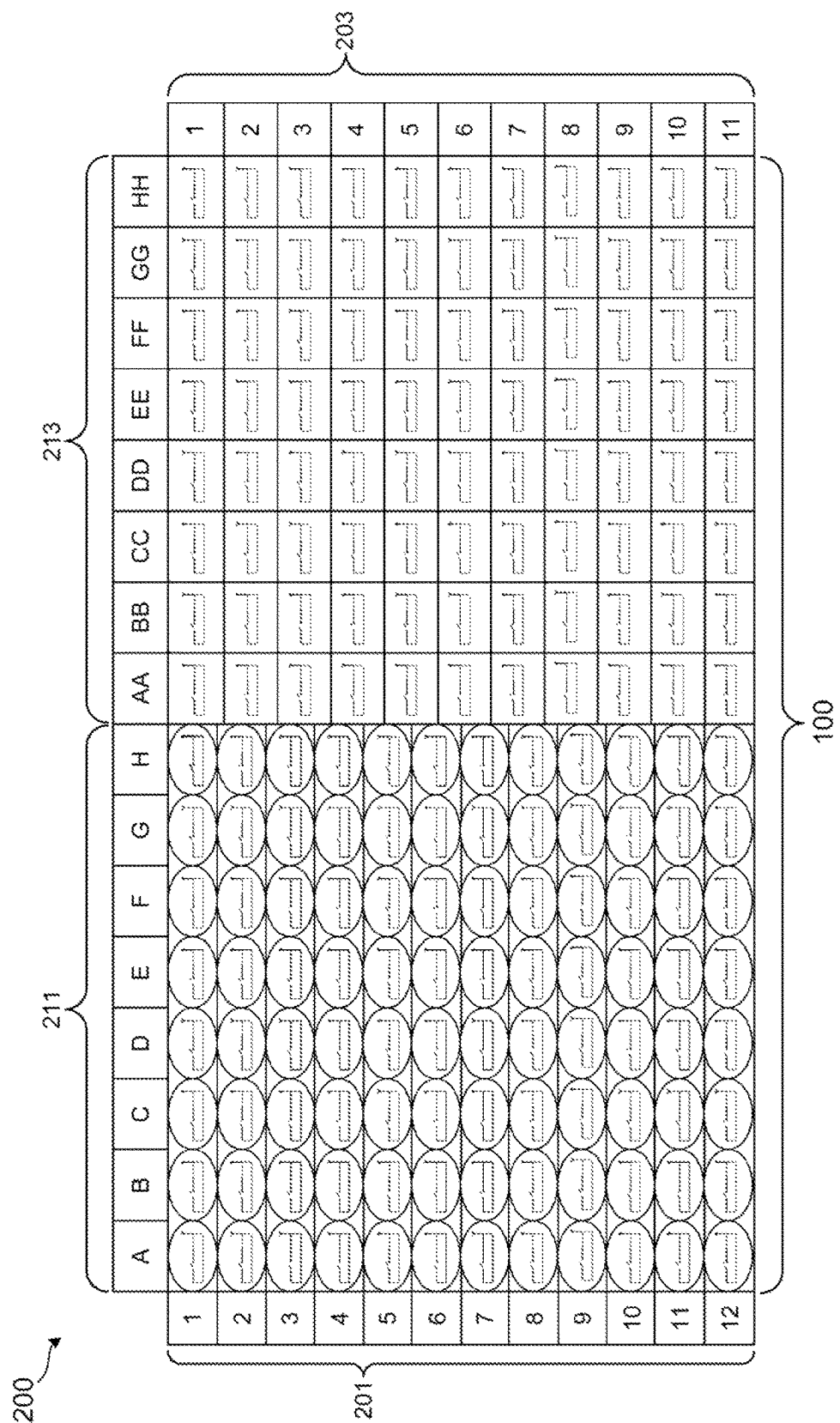
FIG. 2 depicts a schematic diagram an example sheet of self-adhesive sensitive radio frequency identification controls that can be deployed on various surfaces.

In one example implementation of the present disclosure, multiple pressure sensitive RFID controls 100 can be supplied on a sheet of individual self-adhesive RFID pads or stickers. FIG. 2 depicts an example sheet 200 of multiple pressure sensitive RFID controls 100. As shown, the physical dimensions and/or shape of the individual pressure sensitive RFID controls can vary according to the intended application. For example, for use on or attachment to human body parts of a user, the pressure sensitive RFID controls 100 can be circular, oval, or simply have rounded edges and corners, similar to the pressure sensitive RFID controls 100 in rows 201 and columns 211. The pressure sensitive RFD controls 100 in rows 203 and columns 213 can have a square, rectangular or other rectilinear shapes for use on other surfaces, such as desktops, mice, keyboards, monitors, walls, floors, and the like. The size and shape of the pressure sensitive RFID controls 100 can be customized according to the intended use and/or placement of the controls.

The pressure sensitive RFID controls 100 provided in a sheet 200 can each include a corresponding identification code element 110 that can be activated to transmit, or cause transmission of, a corresponding unique identification code. Once registered with a corresponding RFID transceiver and/or computing system, the unique identification code can be associated with the computer function or command to initiate the computer function. To aid in visual organization and identification of sensitive RFID controls 100, each control 100 can include a printed identifier. For example, each of the pressure sensitive RFID controls 100 can include a printed row-column designation or a printed version of the unique identification code contained in the corresponding identification code element 110. In other example implementations, the sheet 200 can be passed through a printer so that's customized labels can be printed on the individual pressure sensitive RFID controls 100. For example, the pressure sensitive RFID controls 100 can be printed with labels (e.g., text, symbols, graphics, colors, etc.) that indicate their intended use or their associated computer function. In various examples, the entire sheet 200 of pressure sensitive RFID controls 100 can be printed with the same label (e.g., a full sheet of "go", "stop", etc. labeled controls), while in other examples, the sheet 200 can be printed to include a full set of customized controls according to the specifications of a particular user and/or computer application.

Figure 3:
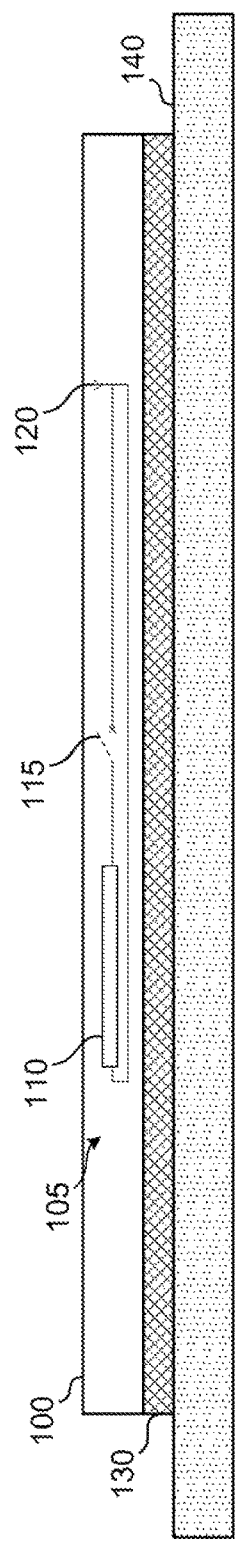
FIG. 3 depicts a cross-section of an example pressure sensitive radio frequency identification control.

FIG. 3 depicts a cross-sectional view of an example self-adhesive pressure sensitive RFID control. The self-adhesive pressure sensitive RFID control can represent an individual sticker that include the pressure sensitive RFID control 100 in the sheet 200 depicted in FIG. 2. As shown, the self-adhesive pressure sensitive RFID control can include the pressure sensitive RFID control 100. As such, the self-adhesive pressure sensitive RFID control can include the a pressure activated RFID circuit 105 embedded in a substrate 120. In example implementations, the substrate 120 can include a flexible or compressible material that allows for compression, deformation, bending, flexing, folding, or other physical manipulation caused by applying pressure to activate the pressure sensitive switch 115 to complete the RFID circuit 105. For example, the substrate 120 can include a latex foam, a paper fiber, paper, cardboard, and other suitable materials.

The substrate 120 can have an adhesive layer 134 applied to one surface or side. As such, the substrate 120 and the adhesive layer 130 can be peeled from a low friction backing as a single piece or sticker to be applied to other surfaces (e.g., a fingertip, desktop, floor, etc.). In some implementations, the adhesive layer 130 can include an adhesive suitable for temporary use on or attachment to human skin. In other implementations, the adhesive layer 130 can include a permanent or curable adhesive for permanently affixing the pressure sensitive RFID control 100 to a surface (e.g., an open region on a keyboard or mouse). In FIG. 3, the surface 140 can represent either a low friction backing on which the pressure sensitive RFID control 100 is supplied, or the surface to which the pressure sensitive RFID control is applied for use.

Figure 4:
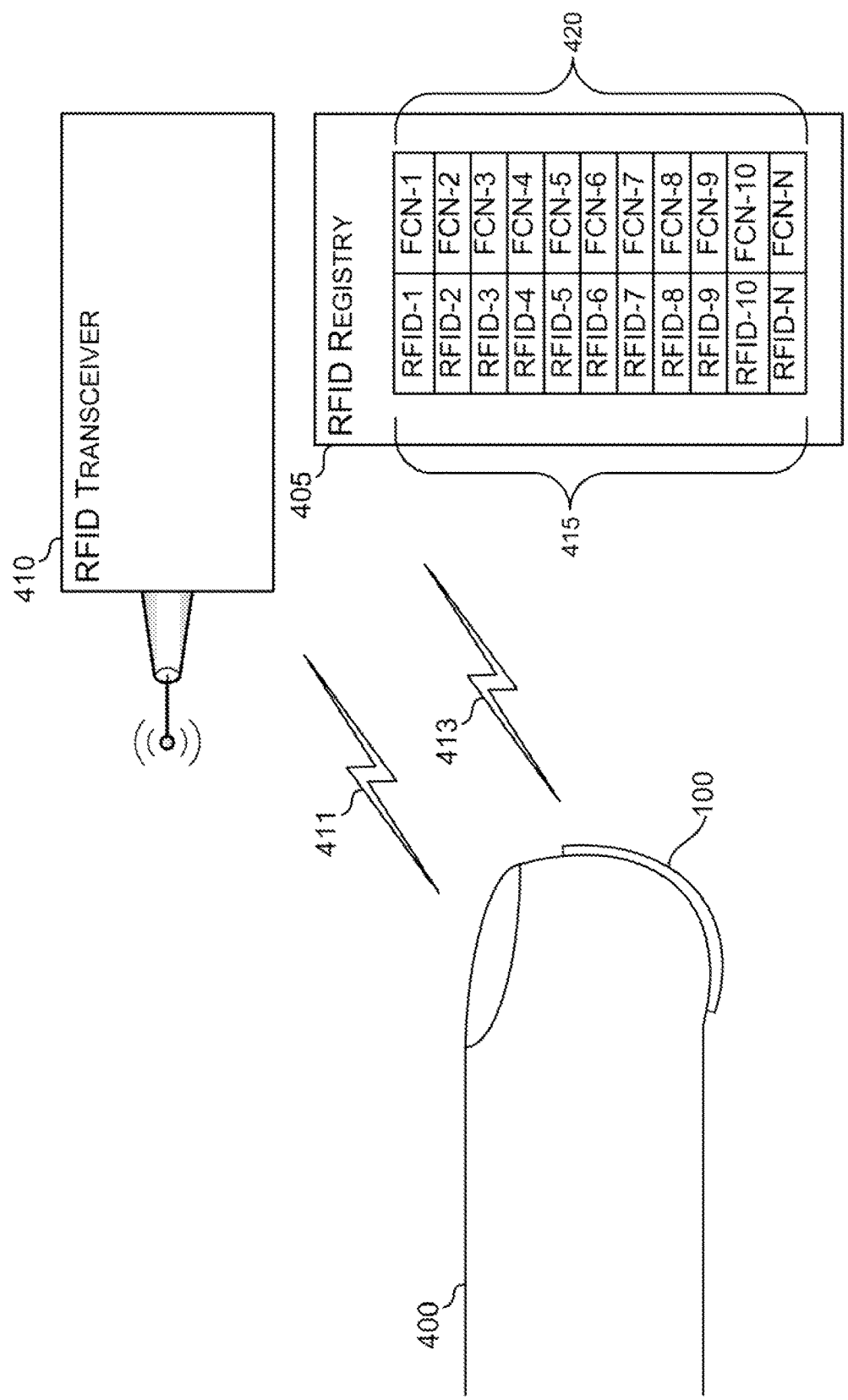
FIG. 4 depicts an example system for associating unique radiofrequency identification controls with a user-defined functionality.

FIG. 4 depicts a process for detecting, registering, and associating a particular computer function with the specific pressure sensitive RFID control 100. As shown, the example depicted in FIG. 4 includes application of a particular pressure sensitive RFID control 100 to the tip of a user finger 400. For example, the pressure sensitive RFID control 100 can include an adhesive layer 130 attachable to human skin. As shown, the self-adhesive pressure sensitive RFID control 100 can include a substrate 120 with sufficient flexibility to conform to the surface of the finger 400.

Before the particular pressure sensitive RFID control 100 can be used or recognized by the RFID transceiver 410, they can be registered with the system. For example, registering the pressure sensitive RFID control 100 can include initiating a registration mode in the RFID transceiver 410 and/or an associated computing system. The RFID transceiver 410 can include a radio frequency transmitter, a radio frequency receiver, and/or other functionality for transmitting and receiving radio frequency transmitted signals from the pressure sensitive RFID controls 100 or other devices.

In various example implementations, the registration mode can include controlling the RFID transceiver 410 to transmit a radio frequency signal 411 capable of exciting a response in the pressure sensitive RFID control 100. The RFID transceiver 410 is transmitting the radio frequency signal 411, a user can depress his or her finger 400 against the surface to apply pressure to and activate the pressure sensitive RFID control 100. While pressure is applied to the pressure sensitive RFID control 100, the component RFID circuit is completed and an RFID response signal 413 is transmitted. The RFID responsible 413 can include a unique identification code associated with the pressure sensitive RFID control 100

The RFID transceiver 410 can detect the RFID response signal 413 and the component unique identification code. The RFID transceiver 410 and/or associated computer system can record the detected unique identification code. Once the unique identification code 415 is registered and recorded in the RFID registry 405, they can be associated with a particular function 420. As shown, the RFID registry 405 can include multiple associations between a unique identification codes 416 and functions 420.

Once a particular pressure sensitive RFID control 100 is registered with the RFID registry 405, it can be used during normal operation of the RFID transceiver 410 to control an associated device. Such devices can include devices such as desktop computers, laptop computers, tablet computers, smart phones, remote controls, and the like. Controlling the associated device can include initiating a command or series of commands, entering a specified user input (e.g., a single alphanumeric keystroke or a combination alphanumeric keystrokes).

In one example implementation, while in the presence of the radio frequency signal 411, pressure can be applied to the pressure sensitive RFID control 100 by pressing the user's finger 400 against another surface. In response to the radio frequency signal 411, the activated RFID circuit 105 can transmit the RFID identification signal 413. The RFID transceiver 410 can receive the transmitted RFID identification signal 413. Receiving the transmitted RFID identification signal can identifying the unique identification code 415 encoded in the transmitted RFID identification signal.

Once a unique identification code 415 is identified, the RFID transceiver 410 and/or an associated computing device can reference the RFID registry 405 to determine if the identified code is associated with a particular function 420. In the event that the identified unique identification code 415 is associated with a function 420, the RFID transceiver 410 and/or the associated computing device can initiate operations to perform the function 420. In some implementations, a single identified unique identification code 415 can be associated with multiple functions 420. For example, a function 420 may include a compound operation or include a function call to another function 420. The order of the operations or functions associate with a particular unique identification code 415 can be defined or undefined. Specifically, upon identification of a unique identification code 415, the RFID transceiver 410 and/or an associated computing device can carry out the associated function 420 and any other associated functions or operations in a specific series or the functions or operations can be performed in parallel or in any order as computing resources allow.

As described herein, the pressure sensitive RFID control 100 can be activated by applying pressure to a surface of the control while in the presence of a compatible radio frequency signal 411. Accordingly, registration and/or activation of a particular pressure sensitive RFID control 100 can occur anywhere within the range of a particular RFID transceiver 410. Such RFID transceivers 410 can transmit the radio frequency signal 411 over various distances. For example, RFID transceiver 410 may operate at power levels sufficient to transmit the radio frequency signal 411 within a few centimeters, however, it may also operate at power levels sufficient to transmit the radio frequency signal 411 up to tens of meters.

Figure 5:
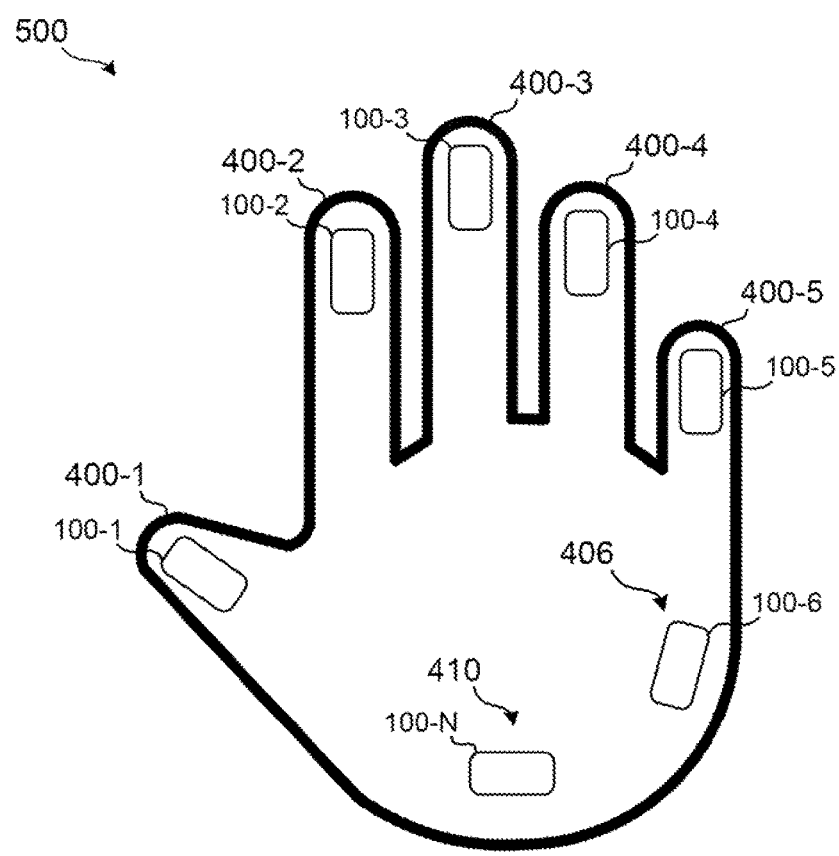
FIG. 5 depicts an example implementation of pressure sensitive radio frequency identification controls attachable to a human hand.

FIG. 5 depicts an example implementation according to the present disclosure. In the specific example shown, individual pressure sensitive RFID controls 100 can be applied to different parts of a user's hand 500. As illustrated, pressure sensitive RFID controls 100-1 through 100-5 can be applied to the pads of fingers 400-1 through 400-5. Additional pressure sensitive RFID controls 100-6 and 100-N can be applied to the side 406 of the hand 500 or the heel 410 of the hand of 500. Accordingly, a single user's hand 500 can include as many as N, where N is an integer, individual and/or unique pressure sensitive RFID controls 100.

As described herein, each of the pressure sensitive RFID controls 100-1 through 100-N can be associated with corresponding unique identification codes. The corresponding unique identification codes can be transmitted when the corresponding pressure sensitive RFID control 100 is activated in the presence of an excitation radio frequency signal 411. As described herein, activation can include pressing on a surface of the pressure sensitive RFID control 100. Accordingly, activation can occur when a user presses a finger 400 having a corresponding pressure sensitive RFID control 100 against another surface. The other surface can be any type of service. For example, the other surface can include a desktop, a keyboard, a wall, a floor, or another finger having a corresponding pressure sensitive RFID control 100.

In scenarios in which two fingers 400 (e.g., finger 400-1 and 400-2) are touched together to activate their corresponding pressure sensitive RFID controls 100 (e.g., RFID controls 100-1 and 100-2) in the presence of a corresponding radio frequency signal 411, each of the pressure sensitive RFID controls 100 can transmit their corresponding unique identification code. The RFID transceiver 410 can identify both registered unique identification codes simultaneously. In some implementations, identification of two or more unique identification codes simultaneously can cause the RFID transceiver 410 and/or an associated computing device to initiate a function 420 associated with the combination of the multiple identification codes. Alternatively, identification of two or more unique identification codes simultaneously can cause the RFID transceiver 410 and/or an associated computing device to simultaneously initiate multiple functions 420 associated with the multiple identification codes.

Figure 6:
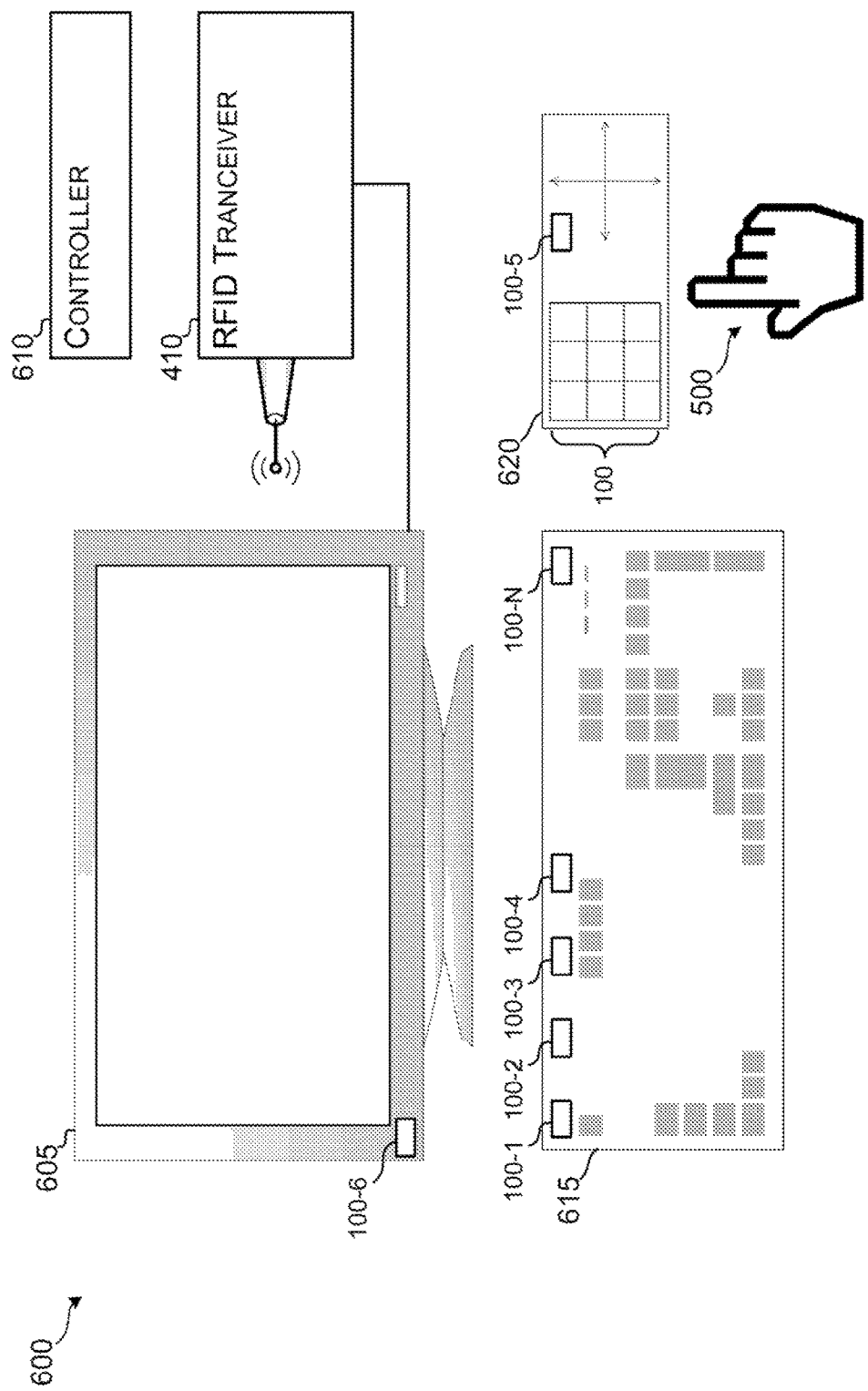
FIG. 6 depicts an example implementation of pressure sensitive radiofrequency identification controls.

FIG. 6 depicts a system 600 in which various examples of the present disclosure can be implemented. As shown, the system 600 can include a controller 610, and RFID transceiver 410 and various display and user input devices. For example, the system can include a monitor 605, the keyboard 615, and/or a peripheral user interface device 620 (e.g., a touchpad or a ten-key keypad, etc.). As illustrated numerous pressure sensitive RFID controls 100 can be affixed to various surfaces of the system 600. For example, pressure sensitive RFID controls 100-1 through 100-4 can be affixed to various surfaces on the keyboard 615. Other pressure sensitive RFID controls 100 and 100-5 can be affixed to services of the peripheral user interface device 620. Pressure sensitive RFID control 100-6 can be affixed to the front bezel of the monitor 605.

While in the vicinity of the RFID transceiver 410, each of the pressure sensitive RFID controls 100 can be registered and/or used to initiate a corresponding function using the controller 610. According to various implementations of the present disclosure, the controller 610 can include any combination of hardware and executable code. For example, the controller 610 can include a microcontroller, a processor, or an application specific integrated circuit (ASIC). In other implementations, the controller 610 can include a controller application instantiated on a computer system. In such implementations, the controller 610 can execute executable code to implement various implementations of the present disclosure for registering the pressure sensitive RFID controls 100 with the system 600, associating corresponding unique identification codes of the registered pressure sensitive RFID controls 100 with specific functions or functions, and recognizing the unique identification codes to initiate the associated function or functions. As described herein, each of the pressure sensitive RFID controls 100-1 through 100-N can include a printed label identifying or indicating the corresponding unique identification code and/or its associated function in the system 600.

Figure 7:
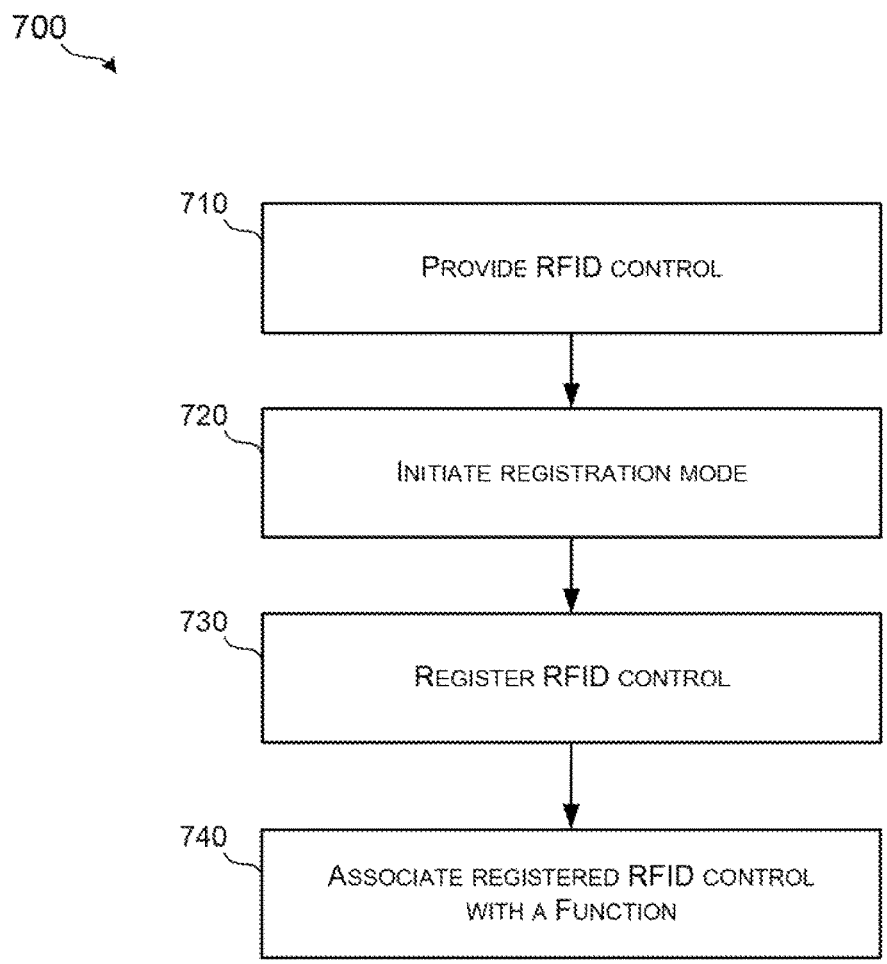
FIG. 7 is a flowchart of an example method for associating pressure sensitive radiofrequency identification controls with specific computer functions.

FIG. 7 is a flowchart of an example method 700 registering the pressure sensitive RFID control 100 according to example implementations of the present disclosure. The method 700 can begin at box 710 in which a pressure sensitive RFID control 100 is placed in a specific location. As described herein, placing a pressure sensitive RFID control 100 can include using an adhesive to affix the pressure sensitive RFID control 100 to particular body parts or surface. Alternatively, providing the pressure sensitive RFID control 100 can include positioning the pressure sensitive RFD control 100 within range of the target RFID transceiver 410 and/or system 600. For example, an individual pressure sensitive RFID control 100 or a sheet 200 of many pressure sensitive RFID controls 100 can be placed near or within the range of the RFID transceiver 410.

With the pressure sensitive RFID control 100 within range of the radio frequency signal 411, a registration mode can be initiated in the system 600 and/or RFID transceiver 410, at box 720. Initiating the registration mode can include placing the controller 610 in a state to recognize previously unregistered identification codes and/or pressure sensitive RFID controls 100. In some implementations, placing the controller 610 and a registration state can include executing a registration routine by entering user input using a keyboard 615, a mouse, and/or a peripheral user input device 620 (e.g., entering a text command, clicking a button and a graphical user interface, or opening an application in a computing device, etc.). Once the registration mode is initiated, any activated pressure sensitive RFID controls 100 transmitting a corresponding unique identification code can be registered at box 730. Registering the identification code can include recording the identification code in RFID registry 405.

At box 740, identification code recognized during the registration mode can be associated with a particular function. Associating an identification code with a particular function can include presenting the user with a user interface through which the user may define the desired function or operation to be performed when the identification code is recognized during normal operation. For example, the user can be presented with a graphical user interface to select the desired function to be associated with and/or initiated by the activation of the corresponding pressure sensitive RFID control 100.

In an alternative implementation, initiating the registration mode can include activating the pressure sensitive RFID control 100 to be registered for some period of time. For example, a user can press and hold one of the pressure sensitive RFID controls 100 within the vicinity of the radio frequency signal 111 transmitted by the RFID transceiver 410 for longer than a predetermined threshold. The predetermined amount of time can include a time period greater than pressure sensitive RFID control b is anticipated to be activated. For example, when a user presses and holds one particular pressure sensitive RFID control 100 for 30 seconds or more, the RFID transceiver 410 and/or the controller 610 can recognize multiple repeated transmissions of the identical unregistered unique identification code for those 30 seconds. In such scenarios, 30 seconds can be considered to be the threshold at which point the RFID transceiver 410 and/or the controller 610 can register the corresponding unique identification code and then prompt the user to select and/or define a desired response from the system 600.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise. All of the features disclosed in this specification (including any accompanying claims, abstract and drawings), and/or all of the elements of any method or process so disclosed, may be combined in any combination, except combinations where at least some of such features and/or elements are mutually exclusive.

What is claimed is:

1. A system comprising:
    a radio frequency transmitter to transmit an excitation radio frequency signal, wherein the excitation radio frequency signal is a radio frequency signal that energizes a pressure activated RFID circuit;
    a plurality of pressure sensitive radio frequency identification controls, wherein the radio frequency identification controls include a self-adhesive planar sticker with a compressible material to allow the pressure activated RFID circuit to be completed when the compressible material is manipulated by pressure;
    a radio frequency receiver to receive, in response to the excitation radio frequency signal, a unique identification code associated with an activated pressure sensitive radio frequency identification control in the plurality of pressure sensitive radio frequency identification controls; and
    a controller to initiate a function associated with the unique identification code.

2. The system of claim 1 wherein the plurality pressure sensitive radio frequency identification controls comprises a plurality of pressure sensitive radio frequency identification controls attachable to a plurality of human body parts.

3. The system of claim 1 wherein the unique identification code comprises a combination of multiple unique identification codes associated with multiple corresponding activated pressure sensitive radio frequency identification controls.

4. A radio frequency identification control comprising:
    an identifier element;
    an antenna element; and
    a pressure sensitive switch to selectively couple the radio identifier circuit to the antenna element to complete a radio frequency identification circuit, wherein the pressure sensitive switch includes a self-adhesive planar sticker with a compressible material to allow a pressure activated RFID circuit to be completed when the compressible material is manipulated by pressure.

5. The radio frequency identification control of claim 4 further comprising:
    a substrate layer comprising the identifier element, the antenna element and the pressure sensitive switch; and
    an adhesive layer disposed on the substrate layer.

6. The radio frequency identification control of claim 5 wherein the adhesive layer comprises a temporary adhesive.

7. The radio frequency identification control of claim 5 wherein the substrate layer comprises a printed identifier.

8. The radio frequency identification control of claim 4 wherein the identifier element comprises a unique identification code associated with a function performed by a computer system.

9. The radio frequency identification control of claim 8 wherein, when the pressure sensitive switch is activated, the radio frequency identification circuit transmits the unique identification code in response to a corresponding radio frequency signal.

10. A method comprising:
    providing a pressure sensitive radio frequency identification control, wherein the radio frequency identification control includes a self-adhesive planar sticker with a compressible material to allow a pressure activated RFID circuit to be completed when the compressible material is manipulated by pressure;
    initiating a registration mode;
    registering the pressure sensitive radio frequency identification control; and
    associating the pressure sensitive radio frequency identification control with a computer function.

11. The method of claim 10 wherein providing the pressure sensitive radio frequency identification control comprises adhering the pressure sensitive radio frequency identification control to a surface.

12. The method of claim 11 wherein the surface comprises a human body part.

13. The method of claim 10 wherein initiating the registration mode comprises:
    transmitting a radio frequency signal corresponding to the pressure sensitive radio frequency identification control; and
    detecting, in response to the radio frequency signal, a number of identical identification code signals from the pressure sensitive radio frequency identification control greater than a threshold number of number of identical identification code signals.

14. The method of claim 10 wherein registering the pressure sensitive radio frequency control comprises:
    transmitting a radio frequency signal corresponding to the pressure sensitive radio frequency identification control;
    detecting, in response to the radio frequency signal, an identification code from the pressure sensitive radio frequency identification control; and
    recording the identification.

15. The method of claim 14 wherein associating the pressure sensitive radio frequency identification control pad with the computer function comprises:
    selecting the computer function based on user input; and
    associating the computer function with the identification code.

* * * * *

UNITED STATES PATENT AND TRADEMARK OFFICE
CERTIFICATE OF CORRECTION

PATENT NO. : 10,445,631 B2
APPLICATION NO. : 15/749059
DATED : October 15, 2019
INVENTOR(S) : Jonathan Neuneker et al.

Page 1 of 1

It is certified that error appears in the above-identified patent and that said Letters Patent is hereby corrected as shown below:

In the Drawings

In sheet 6 of 7, FIG. 6, reference numeral 410, Line 1, delete "TRANCEIVER" and insert -- TRANSCEIVER --, therefor.

In the Claims

In Column 8, Line 42, Claim 13, delete "number of number of" and insert -- number of --, therefor.

Signed and Sealed this
Tenth Day of March, 2020

Andrei Iancu
*Director of the United States Patent and Trademark Office*